United States Patent
Kobayashi

(10) Patent No.: US 7,638,991 B1
(45) Date of Patent: Dec. 29, 2009

(54) SYSTEM AND METHOD FOR PROVIDING SWITCH SIZE MANAGEMENT IN A DC-DC CONVERTER CIRCUIT FOR A RF POWER AMPLIFIER USING AN OUTPUT VOLTAGE REFERENCE SIGNAL

(75) Inventor: Hidenori Kobayashi, Kanagawa-ken (JP)

(73) Assignee: National Semiconductor Corporation, Santa Clara, CA (US)

( * ) Notice: Subject to any disclaimer, the term of this patent is extended or adjusted under 35 U.S.C. 154(b) by 204 days.

(21) Appl. No.: 11/260,128

(22) Filed: Oct. 27, 2005

(51) Int. Cl.
*G05F 1/00* (2006.01)
(52) U.S. Cl. .............. 323/272; 323/283; 323/284; 363/97
(58) Field of Classification Search ............. 323/271, 323/272, 282, 284
See application file for complete search history.

(56) References Cited

U.S. PATENT DOCUMENTS

| | | | |
|---|---|---|---|
| 6,404,173 B1* | 6/2002 | Telefus | 323/272 |
| 6,650,096 B2* | 11/2003 | Lee | 323/272 |
| 7,109,691 B2* | 9/2006 | Brooks et al. | 323/282 |
| 2003/0155898 A1* | 8/2003 | Olsen et al. | 323/283 |
| 2003/0214274 A1* | 11/2003 | Lethellier | 323/272 |
| 2005/0174098 A1* | 8/2005 | Watanabe et al. | 323/282 |
| 2006/0001410 A1* | 1/2006 | Ishikawa et al. | 323/282 |
| 2006/0038543 A1* | 2/2006 | Hazucha et al. | 323/282 |
| 2006/0164366 A1* | 7/2006 | Yu et al. | 345/98 |

* cited by examiner

*Primary Examiner*—Edward Tso
*Assistant Examiner*—Arun Williams

(57) ABSTRACT

A system and method are disclosed for providing switch size management in a direct current to direct current (DC-DC) converter circuit for a radio frequency (RF) power amplifier. An output voltage reference signal is provided to a DC-DC converter that comprises a first switch circuit and a second switch circuit. The output voltage reference signal is compared to a threshold voltage. If the output voltage reference signal is lower than the threshold voltage, control circuitry selects a first switch size. If the output voltage reference signal is higher than the threshold voltage, then the control circuitry selects a second switch size. Selecting an appropriate switch size improves the operating efficiency of the DC-DC converter.

20 Claims, 6 Drawing Sheets

SYSTEM AND METHOD FOR PROVIDING SWITCH SIZE MANAGEMENT IN A DC-DC CONVERTER CIRCUIT FOR A RF POWER AMPLIFIER USING AN OUTPUT VOLTAGE REFERENCE SIGNAL

TECHNICAL FIELD OF THE INVENTION

The present invention is generally directed to manufacturing technology for semiconductor devices and, in particular, to efficient circuitry for providing switch size management in a DC-DC converter circuit for a radio frequency (RF) power amplifier using an output reference signal.

BACKGROUND OF THE INVENTION

A direct current (DC) to direct current (DC) converter circuit is commonly used to provide regulated voltage to various circuits and components. A DC-DC converter circuit is commonly used to provide regulated voltage to a radio frequency (RF) power amplifier circuit. A DC-DC converter circuit that provides an output voltage that is smaller than an input voltage is referred to as a buck converter. A DC-DC converter circuit that provides an output voltage that is greater than an input voltage is referred to as a boost converter. A DC-DC converter circuit that is capable of providing either an output voltage that is smaller than an input voltage or an output voltage that is greater than an input voltage is referred to as a buck-boost converter.

FIG. 1 illustrates an exemplary system 100 comprising a prior art DC-DC converter circuit 110 coupled to a prior art radio frequency (RF) power amplifier 140. The DC-DC converter 110 receives power from an external power supply or battery. The DC-DC converter 110 also receives an output voltage reference signal that gives the target output voltage to be provided by DC-DC converter 110. The output voltage reference signal is provided to DC-DC converter 110 from a control circuit (not shown) such as a baseband processor.

The output of DC-DC converter 110 is coupled to a first end of an inductor 120. A second end of inductor 120 is coupled to the radio frequency (RF) power amplifier (PA) 140. Capacitor 130 is coupled between the second end of inductor 120 and ground. The output voltage of DC-DC converter 110 provides a supply voltage for the radio frequency (RF) power amplifier (PA) 140. The output current from DC-DC converter 110 is provided to the radio frequency (RF) power amplifier (PA) 140.

FIG. 2 illustrates a block diagram showing a more detailed view of DC-DC converter 110. DC-DC converter 110 comprises a pulse width modulation (PWM) controller 210, an output switch driver 220, and a switch 230. The PWM controller 210 receives the output voltage reference signal that sets the target output voltage to be provided by DC-DC converter 110. The output of PWM controller 210 is coupled to an input of the output switch driver 220.

The output switch driver 220 controls the operation of switch 230. Switch 230 comprises a PMOS transistor and an NMOS transistor coupled in a switch configuration. Output signal lines from output switch driver 220 are coupled to the gates of the switch transistors. Output signals from output switch driver 220 control the operation of the switch transistors. The power supply voltage (VDD) for DC-DC converter 110 is coupled to the source of the PMOS transistor of switch 230. The source of the NMOS transistor of switch 230 is coupled to ground. The output of switch 230 is coupled to a first end of inductor 120.

A feedback line 240 is coupled to a second end of inductor 120. The feedback line 240 provides the output voltage signal as feedback to PWM controller 210. PWM controller 210 compares the output voltage and the output voltage reference signal. When the output voltage is less than the output voltage reference signal PWM controller 210 tries to increase the output voltage. When the output voltage is greater than the output voltage reference signal PWM controller 210 tries to decrease the output voltage. In this manner, the PWM controller 210 regulates the output voltage of DC-DC converter 110.

DC-DC converter 110 receives the output voltage reference signal and, in response, provides the target output voltage to the radio frequency (RF) power amplifier (PA) 140. In operation, the target output voltage is changed depending upon the power output requirements of radio frequency (RF) power amplifier (PA) 140. When the RF output power is high, a higher voltage is applied to the RF power amplifier 140 in order to make the power amplifier 140 work efficiently with low distortion. The output current of DC-DC converter 110 (the input current of RFPA 140) is high at this time.

On the other hand, when the RF output power is low, a lower voltage is applied to the RF power amplifier 140 in order to make the RF power amplifier 140 work efficiently. The output current of DC-DC converter 110 (the input current of RFPA 140) is low at this time.

The output current of DC-DC converter 110 (the input current of RFPA 140) and the output voltage of DC-DC converter 110 (the supply voltage of RFPA 140) typically have relationship that is illustrated in FIG. 3. When the output current is low, the output voltage is also low. When the output current is high, the output voltage is high. The coordinate points of the output current and the output voltage typically fall within the shaded area shown in FIG. 3.

For a switching DC-DC converter, it is known that using a large output switch size improves the efficiency of the DC-DC converter at heavy load but degrades the efficiency at light load. On the other hand, using a small output switch size improves the efficiency of the DC-DC converter at light load but degrades the efficiency at heavy load. This phenomenon is illustrated in FIG. 4. FIG. 4 illustrates a graph of DC-DC converter efficiency versus DC-DC converter output current for a small switch size and a large switch size. When a small switch size is used, the efficiency is better at the lower values of output current. When a large switch size is used, the efficiency is better at the higher values of output current.

If one changes the switch size according to the load (represented by the output current), the light load efficiency and the heavy load efficiency will both be improved. This result is very desirable but very difficult to achieve in practice.

In most applications, the output current dynamically changes and it is difficult to determine when the switch size should be changed (from small to large or from large to small). In addition, if the switch size is changed when the DC-DC converter is working, an undesirable voltage signal fluctuation appears on the output voltage signal.

It would be desirable to be able to change the switch size at the same time that the output current changes. However, the time that that output current changes is very difficult or impossible to detect for most applications.

In view of the deficiencies of the prior art systems, it would be advantageous to have a more efficient system and method for changing the switch size in a DC-DC converter circuit.

Before undertaking the Detailed Description of the Invention below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, software, firmware, or combination thereof. It should be noted that the functionality associated with any particular controller may be centralized or distributed, whether locally or remotely.

Definitions for certain words and phrases are provided throughout this patent document, those of ordinary skill in the art should understand that in many, if not most instances, such definitions apply to prior uses, as well as to future uses, of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 5 through 11, discussed below, and the various embodiments used to describe the principles of the present invention in this patent document are by way of illustration only and should not be construed in any way to limit the scope of the invention. Those skilled in the art will understand that the principles of the present invention may be implemented in any type of suitably arranged DC-DC converter circuit.

Figure 1:
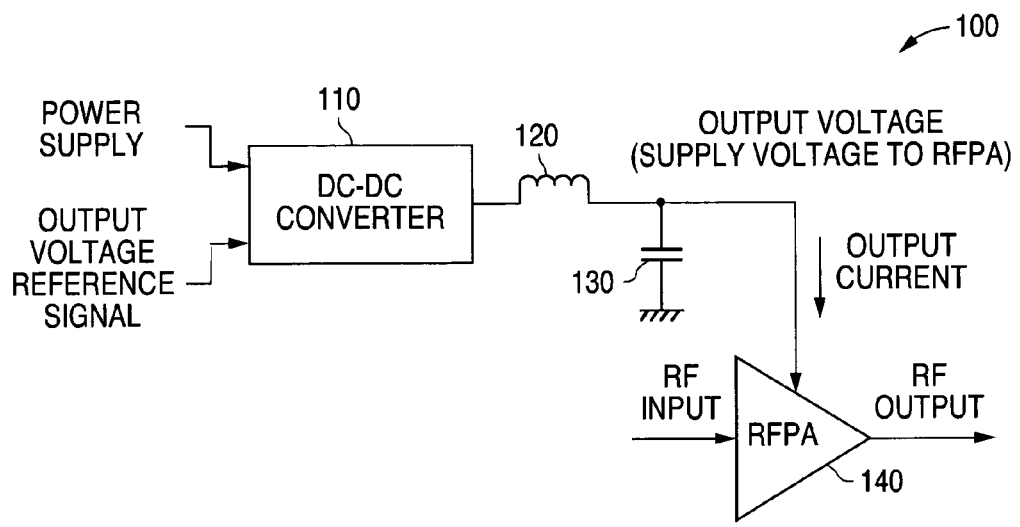
FIG. 1 illustrates an exemplary prior art DC-DC converter circuit coupled to an exemplary prior art radio frequency (RF) power amplifier.
Figure 2:
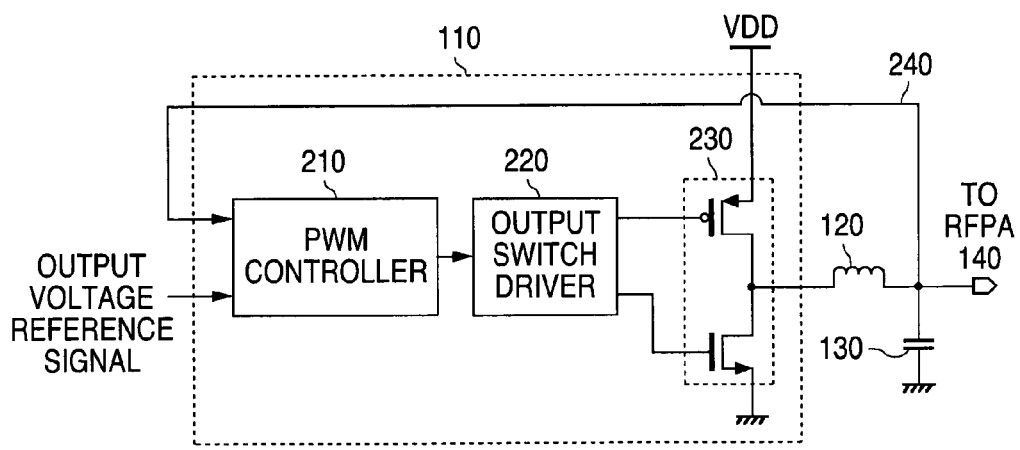
FIG. 2 illustrates a block diagram showing a more detailed view of the DC-DC converter circuit shown in FIG. 1.
Figure 3:
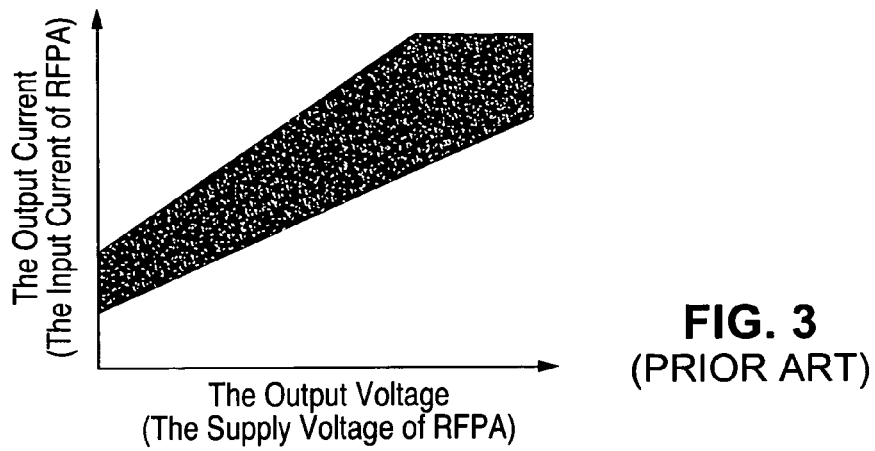
FIG. 3 illustrates an exemplary graph of a typical relationship between an output current and an output voltage of a DC-DC converter.
Figure 4:
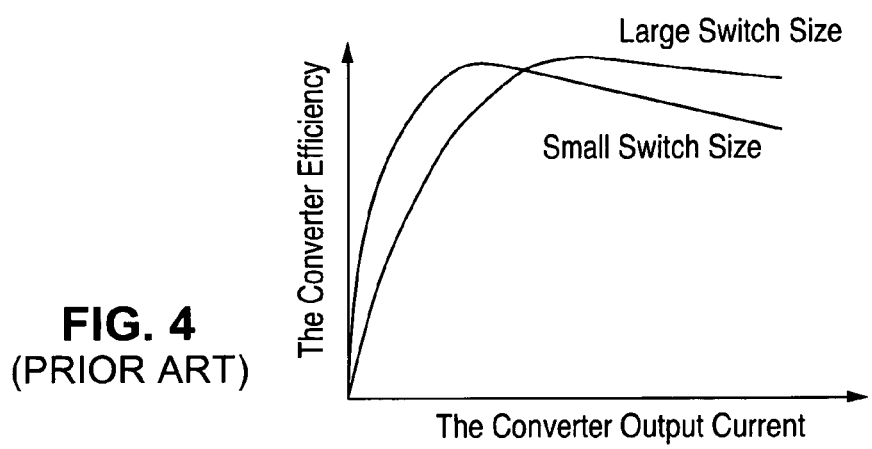
FIG. 4 illustrates a graph of DC-DC converter efficiency versus DC-DC converter output current for a small switch size DC-DC converter and a large switch size DC-DC converter.
Figure 5:
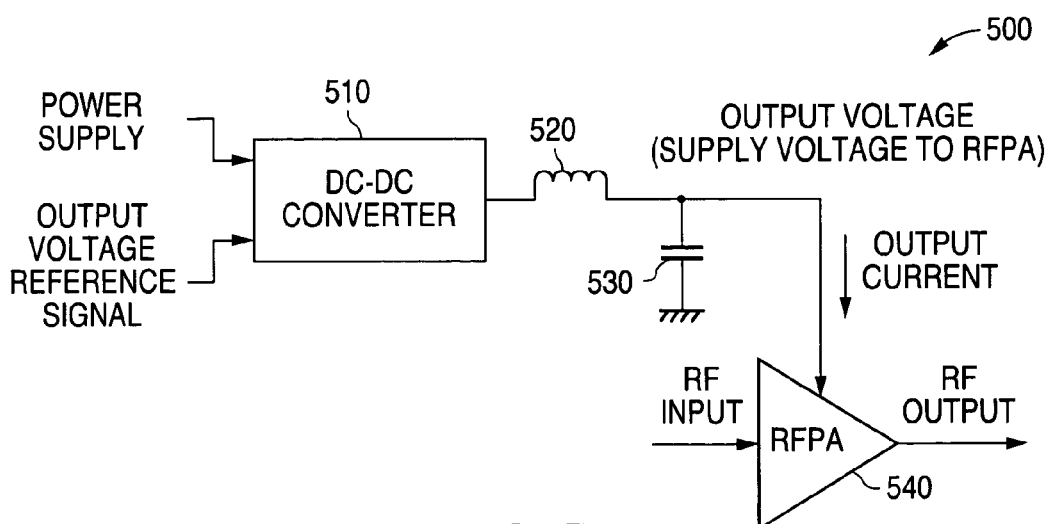
FIG. 5 illustrates a DC-DC converter circuit of the present invention coupled to an exemplary prior art radio frequency (RF) power amplifier.

FIG. 5 illustrates a system 500 comprising a DC-DC converter circuit 510 of the present invention coupled to a prior art radio frequency (RF) power amplifier 540. The DC-DC converter 510 receives power from an external power supply. The DC-DC converter 510 also receives an output voltage reference signal that gives the target output voltage to be provided by DC-DC converter 510. The output voltage reference signal is provided to DC-DC converter 510 from a control circuit (not shown) such as a baseband processor.

The output of DC-DC converter 510 is coupled to a first end of an inductor 520. A second end of inductor 520 is coupled to the radio frequency (RF) power amplifier (PA) 540. Capacitor 530 is coupled between the second end of inductor 520 and ground. The output voltage of DC-DC converter 510 provides a supply voltage for the radio frequency (RF) power amplifier (PA) 540. The output current from DC-DC converter 510 is provided to the radio frequency (RF) power amplifier (PA) 540.

In the DC-DC converter 510 of the present invention the value of the output current can be easily estimated using the value of the output voltage reference signal. The actual value of the output current does not have to be measured. Furthermore the output voltage reference signal is changed before the output voltage and the output current increases (or decreases). This means that the output voltage reference signal is very suitable for management of the switch size of a DC-DC converter.

The switch size can be made large at the same time that the output current is increasing. The switch size can be made small at the same time that the output current is decreasing. When the output reference voltage changes, the output voltage will change. This means that one does not have to be concerned about an output voltage fluctuation due to the change in the switch size because the output voltage in is transition at that time anyway.

The DC-DC converter 510 compares the output voltage reference signal and a pre-determined threshold voltage. If the output voltage reference signal is higher than the threshold voltage, then the large size switch is selected. If the output voltage reference signal is lower than the threshold voltage, then the small size switch is selected. In order to increase noise tolerance, some hysteresis may optionally be added to the circuit.

Figure 6:
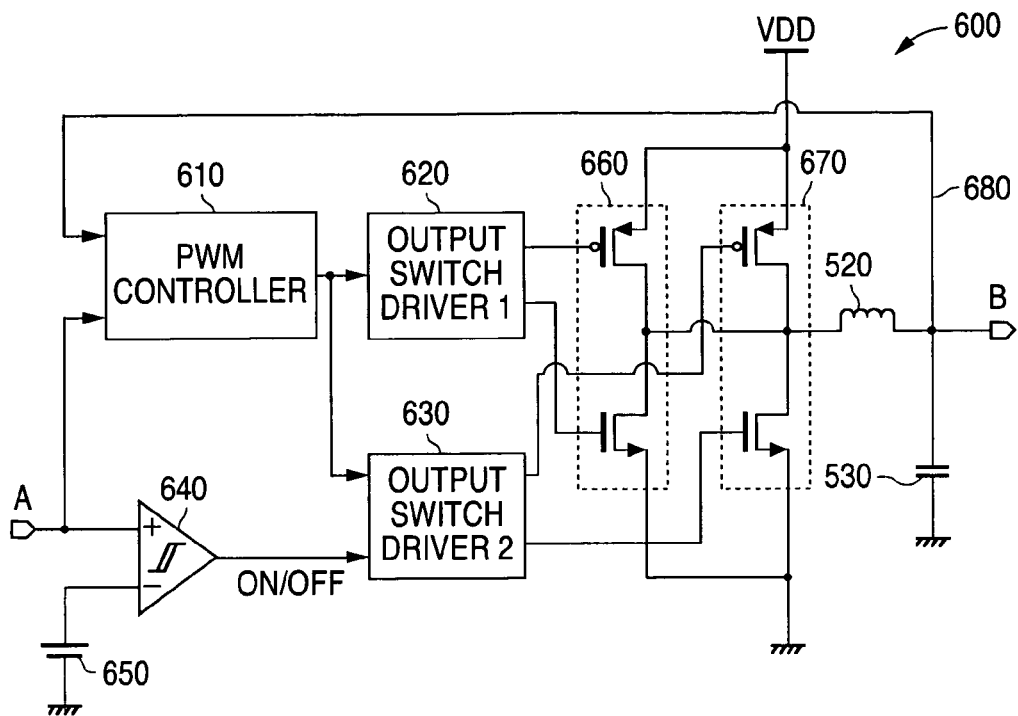
FIG. 6 illustrates a block diagram showing one advantageous embodiment of a buck DC-DC converter circuit of the present invention.

FIG. 6 illustrates a block diagram showing one advantageous embodiment of a pulse width modulated (PWM) synchronous buck DC-DC converter circuit 600 of the present invention. DC-DC converter 600 comprises a pulse width modulation (PWM) controller 610, a first output switch driver 620, a second output switch driver 630, a comparator circuit 640, a threshold voltage source 650, a first switch 660, and a second switch 670. The PWM controller 610 and the comparator circuit 640 both receive the output voltage reference signal from Node A. The comparator circuit 640 receives the pre-determined threshold voltage from the threshold voltage source 650.

The output of PWM controller 610 is coupled to an input of the first output switch driver 620 and to an input of the second output switch driver 630. The output of comparator circuit 640 is coupled to an input of the second output switch driver 630. The output of comparator circuit 640 is an On/Off signal that sequentially activates and deactivates the operation of output switch driver 630.

The first output switch driver 620 controls the operation of first switch 660. First switch 660 comprises a PMOS transistor and an NMOS transistor coupled in a switch configuration. Output signal lines from first output switch driver 620 are coupled to the gates of the switch transistors of first switch 660. Output signals from first output switch driver 620 control the operation of the switch transistors of first switch 660.

Second switch 670 also comprises a PMOS transistor and an NMOS transistor coupled in a switch configuration. Second switch 670 is coupled in parallel with first switch 660. The second output switch driver 630 controls the operation of second switch 670. Output signal lines from second output switch driver 630 are coupled to the gates of the switch transistors of second switch 630. Output signals from second output switch driver 630 control the operation of the switch transistors of second switch 670.

The power supply voltage (VDD) for DC-DC converter 600 is coupled to the source of the PMOS transistor of the first switch 660 and to the source of the PMOS transistor of the second switch 670. The sources of the NMOS transistors of the first and second switches are coupled to ground.

The output of first switch 660 is coupled to a first end of inductor 520 and the output of second switch 670 is coupled to the first end of inductor 520. A second end of inductor 520 is coupled to the radio frequency (RF) power amplifier (PA) 540 through Node B. Feedback line 680 provides the output voltage at the second end of inductor 520 to an input of the PWM controller 610. Capacitor 530 is coupled between the second end of inductor 520 and ground. The voltage at Node B is also provided to an input of PWM controller 610.

The output voltage of DC-DC converter 510 provides a supply voltage for the radio frequency (RF) power amplifier (PA) 540 through Node B. The output current from DC-DC converter 510 is provided to the radio frequency (RF) power amplifier (PA) 540 through Node B.

The first output switch driver 620 is always working. This means that first switch 660 is always operating the DC-DC converter 600 at the first switch size. The second output switch driver 630 only works when it is activated by comparator circuit 640. That is, the second output switch driver 630 only works when the output voltage reference signal at Node A is larger than the pre-determined threshold voltage from threshold voltage source 650.

When the output voltage reference signal at Node A is smaller than the pre-determined threshold voltage from threshold voltage source 650, then the comparator circuit 640 sends a disable signal (an "Off" signal) to the second output switch driver 630. In response, the second output switch driver 630 disables the operation of second switch 670. The operations of the first output switch driver 620 and first switch 660 are not affected. The DC-DC converter 600 continues to operate at the first switch size.

When the output voltage reference signal at Node A becomes greater than the pre-determined threshold voltage from threshold voltage source 650, then the comparator circuit 640 sends an enable signal (an "On" signal) to the second output switch driver 630. In response, the second output switch driver 630 enables the operation of second switch 670. The operations of the first output switch driver 620 and first switch 660 are not affected. The DC-DC converter 600 now operates with the second switch size added to the first switch size.

The size of the first switch 660, the size of the second switch 670, and the size of the threshold voltage 650 may be selected to maximize the efficiency of DC-DC converter 600 in a particular application.

In one advantageous embodiment of the present invention, the operation of the first switch 660 effectively provides a switch that has a small switch size (that is more efficient at lower values of DC-DC converter output current). When the second switch 670 is also in operation, the concurrent operation of the first switch 660 and the second switch 670 effectively provides a switch that has a large switch size (that is more efficient at higher values of DC-DC converter output current).

The present invention efficiently accomplishes the switching from a small switch size configuration to a large switch size configuration (and vice versa) by using comparison circuit 640. As previously described, comparison circuit 640 compares the output voltage reference signal from Node A with the threshold voltage from threshold voltage source 650. When the magnitude of the output voltage reference signal is increased to a level that is greater than the threshold voltage, then the large switch size configuration is in operation. Otherwise, the small switch size configuration remains in operation.

Figure 7:
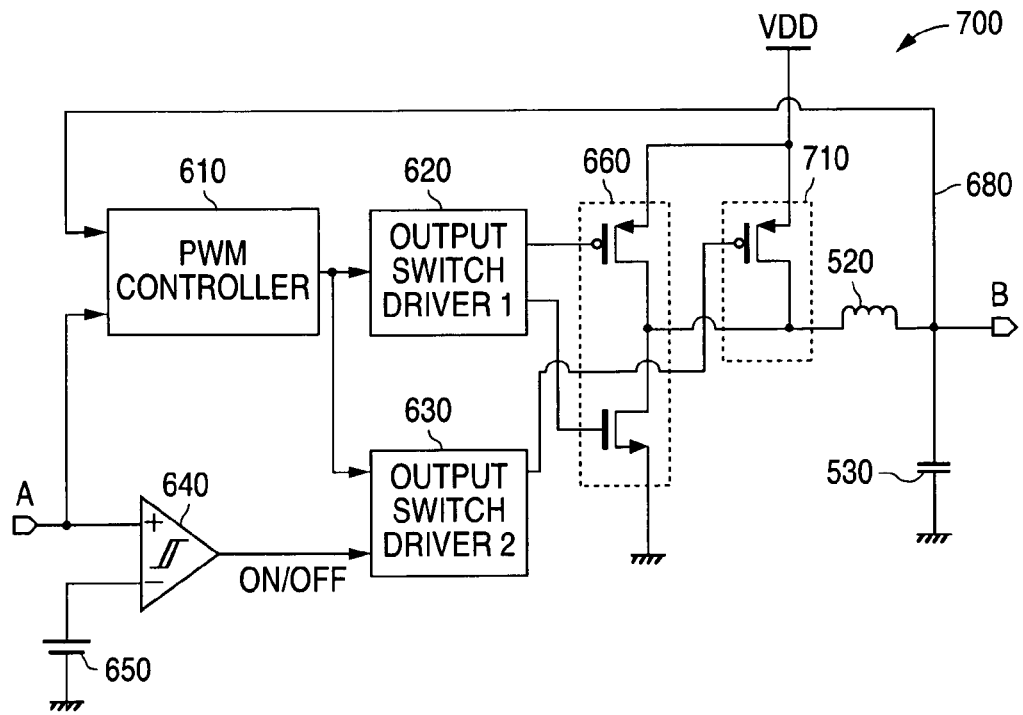
FIG. 7 illustrates a block diagram showing another advantageous embodiment of the buck DC-DC converter circuit of the present invention.

FIG. 7 illustrates a block diagram showing another advantageous embodiment of a DC-DC converter circuit 700 of the present invention. The operation of DC-DC converter circuit 700 is similar to the operation of DC-DC converter circuit 600 except that the low side transistor of switch 670 (i.e., the NMOS transistor) has been removed. Switch 670 of DC-DC converter 600 has been replaced with switch 710 of DC-DC converter 700.

The embodiment that is represented by DC-DC converter 700 shows that it is not necessary to change both the high side and low side switch transistors. The low side switch transistor (i.e., the NMOS transistor) is absent in switch 710 of DC-DC converter 700. The second output switch driver 630 controls the high side switch transistor in switch 710 (i.e., the PMOS transistor) by providing a control signal to the gate of the high side switch transistor.

The first output switch driver 620 of DC-DC converter 700 is always working. This means that first switch 660 is always operating the DC-DC converter 700 at the first switch size. The second output switch driver 630 of DC-DC converter 700 only works when it is activated by comparator circuit 640. That is, the second output switch driver 630 only works when the output voltage reference signal at Node A is larger than the pre-determined threshold voltage from threshold voltage source 650.

When the output voltage reference signal at Node A is smaller than the pre-determined threshold voltage from threshold voltage source 650, then the comparator circuit 640 sends a disable signal (an "Off" signal) to the second output switch driver 630. In response, the second output switch driver 630 disables the operation of second switch 710. The operations of the first output switch driver 620 and first switch 660 are not affected. The DC-DC converter 700 continues to operate at the first switch size.

When the output voltage reference signal at Node A becomes greater than the pre-determined threshold voltage from threshold voltage source 650, then the comparator circuit 640 sends an enable signal (an "On" signal) to the second output switch driver 630. In response, the second output switch driver 630 enables the operation of second switch 710. The operations of the first output switch driver 620 and first switch 660 are not affected. The DC-DC converter 700 now operates with the second switch size added to the first switch size.

The size of the first switch 660, the size of the second switch 710, and the size of the threshold voltage 650 may be selected to maximize the efficiency of DC-DC converter 700 in a particular application.

In one advantageous embodiment of the present invention, the operation of the first switch 660 effectively provides a switch that has a small switch size (that is more efficient at lower values of DC-DC converter output current). When the second switch 710 is also in operation, the concurrent operation of the first switch 660 and the second switch 710 effectively provides a switch that has a large switch size (that is more efficient at higher values of DC-DC converter output current).

The present invention efficiently accomplishes the switching from a small switch size configuration to a large switch size configuration (and vice versa) by using comparison circuit 640. As previously described, comparison circuit 640 compares the output voltage reference signal from Node A with the threshold voltage from threshold voltage source 650. When the magnitude of the output voltage reference signal is increased to a level that is greater than the threshold voltage, then the large switch size configuration is in operation. Otherwise, the small switch size configuration remains in operation.

Figure 8:
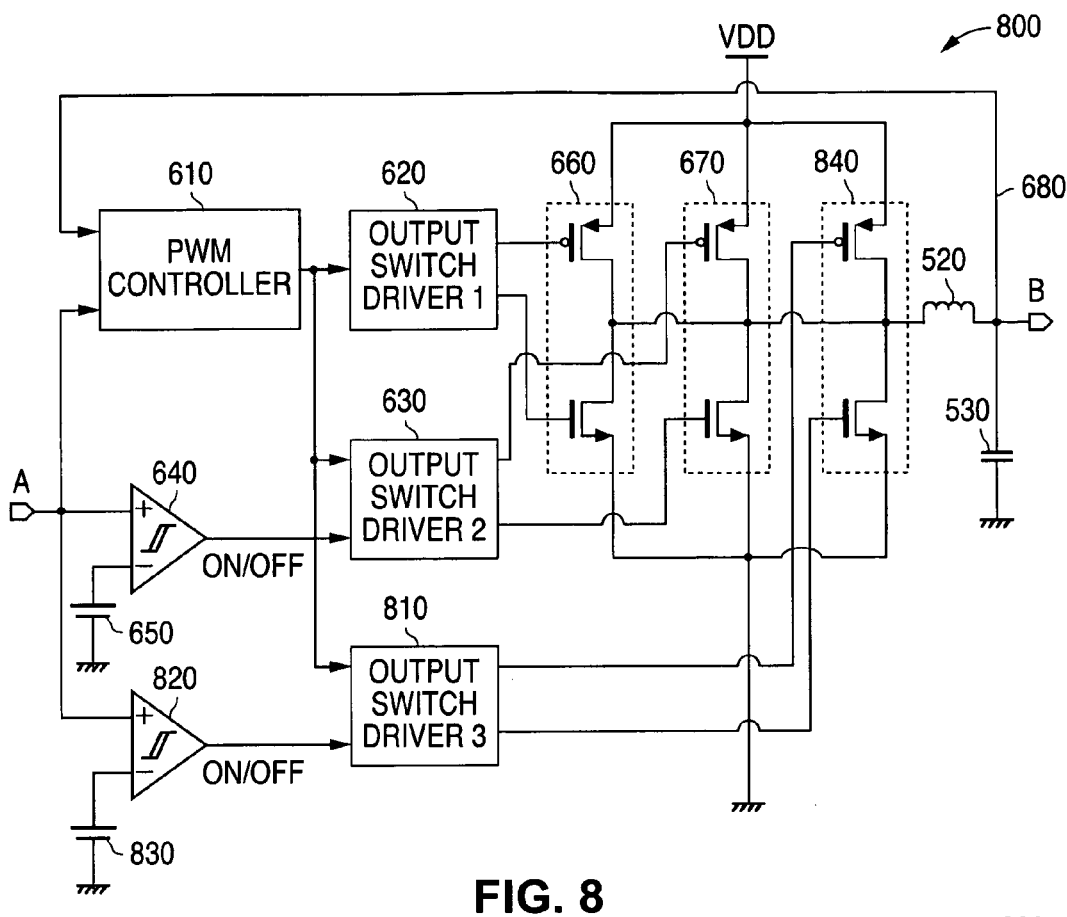
FIG. 8 illustrates a block diagram showing another advantageous embodiment of the buck DC-DC converter circuit of the present invention.

FIG. 8 illustrates a block diagram showing another advantageous embodiment of a DC-DC converter circuit 800 of the present invention. The structure of DC-DC converter circuit 800 is similar to the structure of DC-DC converter circuit 600 except that a third switch 840, a second comparator circuit 820, and a second threshold voltage source 830 have been added. DC-DC converter circuit 800 comprises three switches. The three switches are first switch 660, second switch 670, and third switch 840.

The embodiment that is represented by DC-DC converter 800 shows that the principle of operation of the present invention is not limited to the use of only two switches. Additional switches (and their corresponding output switch drivers and comparator circuits) can be used to change the switch size of a DC-DC converter circuit.

The first output switch driver 620 of DC-DC converter 800 is always working. This means that first switch 660 is always operating the DC-DC converter 800 at the first switch size. The second output switch driver 630 of DC-DC converter 800 only works when it is activated by comparator circuit 640. That is, the second output switch driver 630 only works when the output voltage reference signal at Node A is larger than the pre-determined threshold voltage from threshold voltage source 650.

When the output voltage reference signal at Node A is smaller than the pre-determined threshold voltage from threshold voltage source 650, then the comparator circuit 640 sends a disable signal (an "Off" signal) to the second output switch driver 630. In response, the second output switch driver 630 disables the operation of second switch 670. The operations of the first output switch driver 620 and first switch 660 are not affected. The DC-DC converter 800 continues to operate at the first switch size.

When the output voltage reference signal at Node A becomes greater than the pre-determined threshold voltage from threshold voltage source 650, then the comparator circuit 640 sends an enable signal (an "On" signal) to the second output switch driver 630. In response, the second output switch driver 630 enables the operation of second switch 670. The operations of the first output switch driver 620 and first switch 660 are not affected. The DC-DC converter 800 now operates with the second switch size added to the first switch size.

Similarly, the third output switch driver 810 of DC-DC converter 800 only works when it is activated by comparator circuit 820. That is, the third output switch driver 810 only works when the output reference signal at Node A is larger than the pre-determined threshold voltage from threshold voltage source 830.

When the output voltage reference signal at Node A is smaller than the pre-determined threshold voltage from threshold voltage source 830, then the comparator circuit 820 sends a disable signal (an "Off" signal) to the third output switch driver 810. In response, the third output switch driver 810 disables the operation of third switch 840. The operations of the first output switch driver 620 and first switch 660 are not affected. The operations of the second output switch driver 630 and second switch 670 are not affected. The DC-DC converter 800 continues to operate either at the first switch size (if only the first switch 660 is active) or at the combination of the first switch size and the second switch size (if both the first switch 660 and the second switch 670 are active).

When the output voltage reference signal at Node A becomes greater than the pre-determined threshold voltage from threshold voltage source 820, then the comparator circuit 820 sends an enable signal (an "On" signal) to the third output switch driver 810. In response, the third output switch driver 810 enables the operation of third switch 840. The operations of the first output switch driver 620 and first switch 660 are not affected. The operations of the second output switch driver 630 and second switch 670 are not affected. The DC-DC converter 800 now operates with the third switch size added to the first switch size and the second switch size.

The size of the first switch 660, the size of the second switch 670, the size of the third switch 840, the size of the first threshold voltage 650, and the size of the second threshold voltage 820 may be selected to maximize the efficiency of DC-DC converter 800 in a particular application.

The operation of the first switch 660 of DC-DC converter 800 effectively provides a switch that has a small switch size (that is more efficient at lower values of DC-DC converter output current). When the second switch 670 is also in operation, the concurrent operation of the first switch 660 and the second switch 670 effectively provides a switch that has an intermediate switch size (that is more efficient at intermediate values of DC-DC converter output current). When the third switch 840 is also in operation, the concurrent operation of the first switch 660 and the second switch 670 and the third switch 840 effectively provides a switch that has a high switch size (that is more efficient a high values of DC-DC converter output current).

Figure 9:
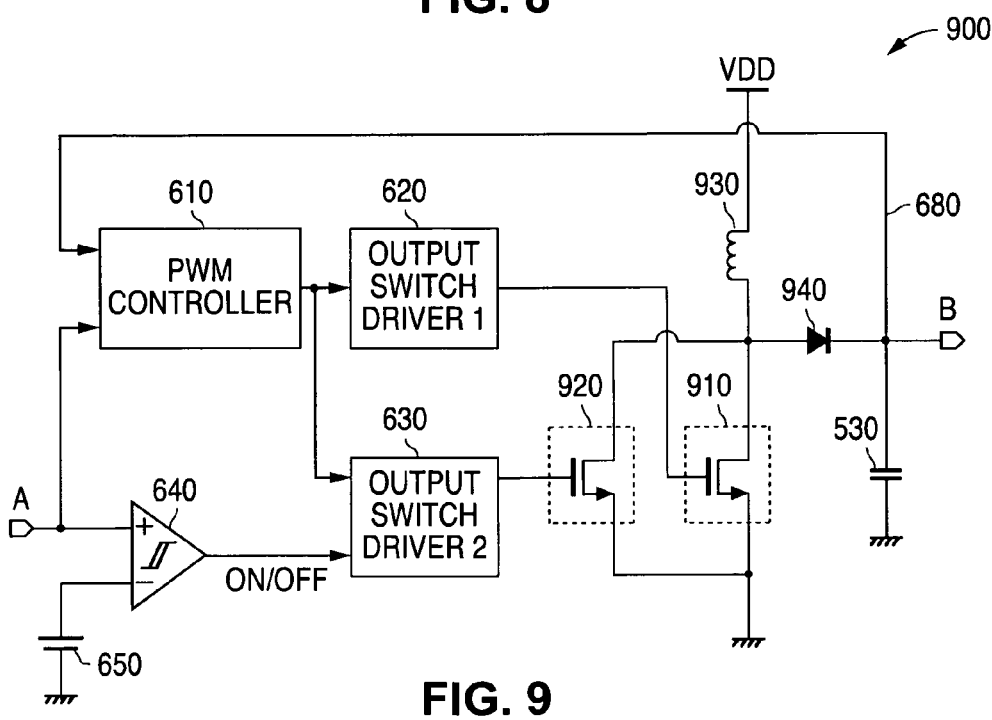
FIG. 9 illustrates a block diagram showing an advantageous embodiment of a boost DC-DC converter circuit of the present invention shown.

FIG. 9 illustrates a block diagram showing an advantageous embodiment of a boost DC-DC converter circuit 900 of the present invention. The structure of DC-DC converter circuit 900 is somewhat similar to the structure of DC-DC converter circuit 600 except that (1) the first output switch driver 620 controls an NMOS switch transistor of first switch 910, and (2) the second output switch driver 630 controls an NMOS switch transistor of second switch 920.

The output of first output switch driver 620 is coupled to the gate of the NMOS transistor of first switch 910. The output of second switch driver 630 is coupled to the gate of the NMOS transistor of second switch 920. The source of the NMOS switch transistor in first switch 910 and the source of the NMOS switch transistor in second switch 920 are coupled to ground. The drain of the NMOS switch transistor in first switch 910 and the drain of the NMOS switch transistor in second switch 920 are coupled to the power supply VDD through an inductor 930. The output of first switch 910 and the output of second switch 920 are coupled to Node B through a diode 940.

The first output switch driver 620 of DC-DC converter 900 is always working. This means that first switch 910 is always operating the DC-DC converter 900 at the first switch size. The second output switch driver 630 of DC-DC converter 900 only works when it is activated by comparator circuit 640. That is, the second output switch driver 630 only works when the output voltage reference signal at Node A is larger than the pre-determined threshold voltage from threshold voltage source 650.

When the output voltage reference signal at Node A is smaller than the pre-determined threshold voltage from threshold voltage source 650, then the comparator circuit 640 sends a disable signal (an "Off" signal) to the second output switch driver 630. In response, the second output switch driver 630 disables the operation of second switch 920. The operations of the first output switch driver 620 and first switch 910 are not affected. The DC-DC converter 900 continues to operate at the first switch size.

When the output voltage reference signal at Node A becomes greater than the pre-determined threshold voltage from threshold voltage source 650, then the comparator circuit 640 sends an enable signal (an "On" signal) to the second output switch driver 630. In response, the second output switch driver 630 enables the operation of second switch 920. The operations of the first output switch driver 620 and first switch 910 are not affected. The DC-DC converter 900 now operates with the second switch size added to the first switch size.

Figure 10:
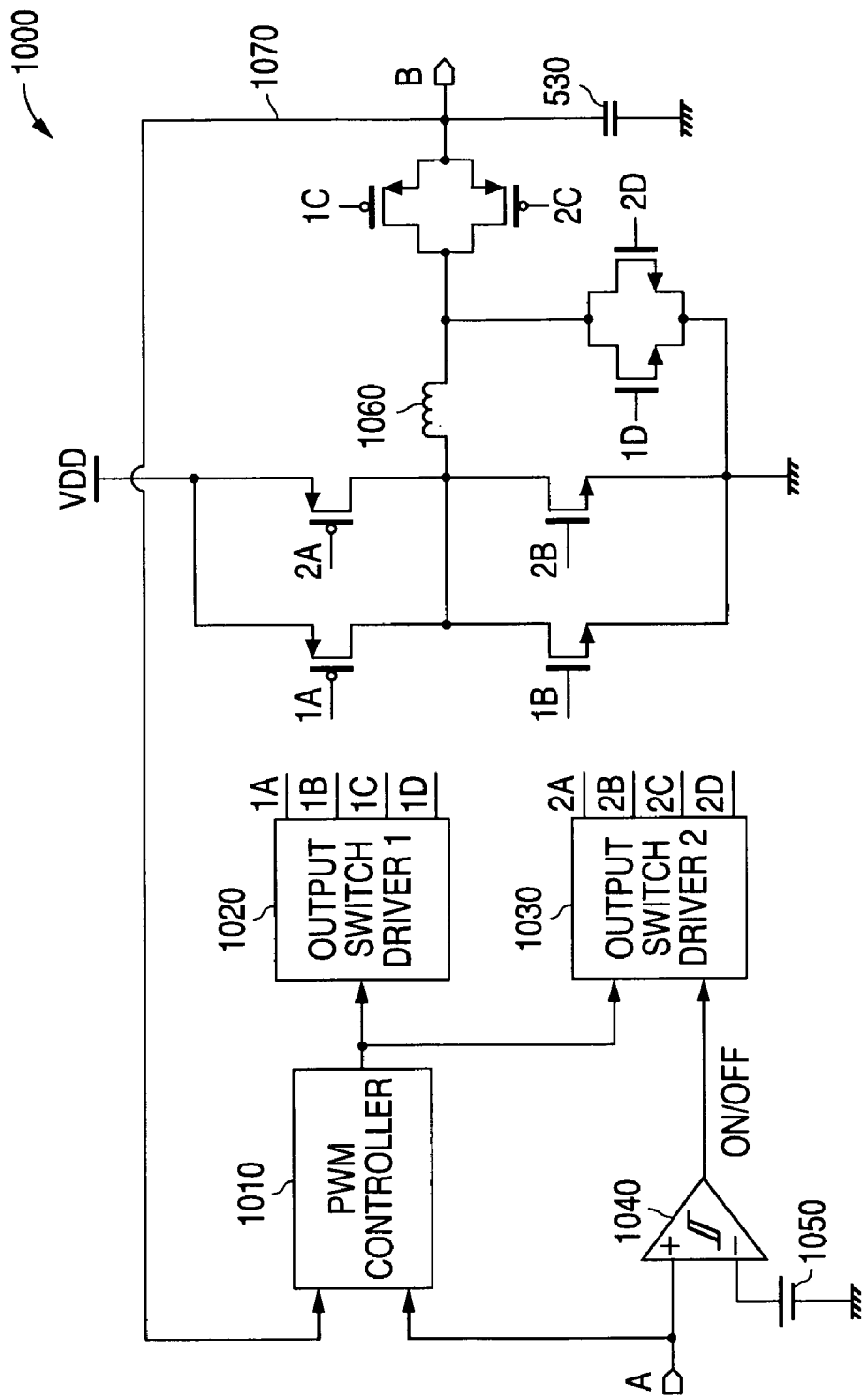
FIG. 10 illustrates a block diagram showing an advantageous embodiment of a buck-boost DC-DC converter circuit of the present invention.

FIG. 10 illustrates a block diagram showing an advantageous embodiment of a buck-boost DC-DC converter circuit 1000 of the present invention. DC-DC converter 1000 comprises a pulse width modulation (PWM) controller 1010, a first output switch driver 1020, a second output switch driver 1030, a comparator circuit 1040, and a threshold voltage source 1050.

The structure of DC-DC converter circuit 1000 is somewhat similar to the structure of DC-DC converter circuit 600 except that (1) the first output switch driver 1020 controls a first set of four switch transistors (1A, 1B, 1C, and 1D), and (2) the second output switch driver 1030 controls a second set of four switch transistors (2A, 2B, 2C, and 2D).

A first switch that is controlled by first output switch driver 1020 is made up of a PMOS transistor 1A and an NMOS transistor 1B that are coupled together in a switch configuration. The first switch of DC-DC converter 1000 is analogous to first switch 660 of DC-DC converter 600.

A second switch that is controlled by second output switch driver 1030 is made up of a PMOS transistor 2A and an NMOS transistor 2B that are coupled together in a switch configuration. The second switch of DC-DC converter 1000 is analogous to second switch 670 of DC-DC converter 600.

The output of the first switch and the output of the second switch of DC-DC converter 1000 are coupled to Node B through inductor 1060 and through a third switch. The third switch comprises a first PMOS transistor 1C that is controlled by first output switch driver 1020 and a second PMOS transistor 2C that is controlled by second output switch driver 1030. First PMOS transistor 1C and second PMOS transistor 2C are coupled together in a parallel configuration as shown in FIG. 10.

The fourth switch of DC-DC converter 1000 comprises a first NMOS transistor 1D that is controlled by first output switch driver 1020 and a second NMOS transistor 2D that is controlled by second output switch driver 1030. First NMOS transistor 1D and second NMOS transistor 2D are coupled together in a parallel configuration as shown in FIG. 10. The source of first NMOS transistor 1D and the source of second NMOS transistor 2D are coupled to ground. The drain of first NMOS transistor 1D and the drain of second NMOS transistor 2D are coupled between inductor 1060 and the third switch of DC-DC converter 1000. Feedback line 1070 provides the output voltage signal as feedback to PWM controller 1010.

When the DC-DC converter 1000 is operating in buck mode, the first output switch driver 1020 is continually activating the first switch (1A, 1B). This means that the first switch (1A, 1B) is always operating DC-DC converter 1000 at the first switch size. The second output switch driver 1030 of DC-DC converter 1000 only works when it is activated by comparator circuit 1040. That is, the second output switch driver 1030 only works when the output voltage reference signal at Node A is larger than the pre-determined threshold voltage from threshold voltage source 1050.

When the output voltage reference signal at Node A is smaller than the pre-determined threshold voltage from threshold voltage source 1050, then the comparator circuit 1040 sends a disable signal (an "Off" signal) to the second output switch driver 1030. In response, the second output switch driver 1030 disables the operation of the second switch (2A, 2B). The operations of the first output switch driver 1020 and the first switch (1A, 1B) are not affected. The DC-DC converter 1000 continues to operate at the first switch size.

When the output voltage reference signal at Node A becomes greater than the pre-determined threshold voltage from threshold voltage source 1050, then the comparator circuit 1040 sends an enable signal (an "On" signal) to the second output switch driver 1030. In response, the second output switch driver 1030 enables the operation of the second switch (2A, 2B). The operations of the first output switch driver 1020 and the first switch (1A, 1B) are not affected. The DC-DC converter 1000 now operates with the second switch size added to the first switch size.

When DC-DC converter 1000 is operating in boost mode, the first output switch driver 1020 sends appropriate control signals to the first switch (1A, 1B), and to the first PMOS transistor 1C of the third switch (1C, 2C) and to the first NMOS transistor 1D of the fourth switch (1D, 2D). When the second output switch driver 1030 is activated by the comparator circuit 1040, the second output switch driver 1030 sends appropriate control signals to the second switch (2A, 2B), and to the second PMOS transistor 2C of the third switch (1C, 2C) and to the second NMOS transistor 2D of the fourth switch (1D, 2D).

The DC-DC converter 1000 is capable of providing switch size management capability in either a buck mode of operation or a boost mode of operation.

Figure 11:
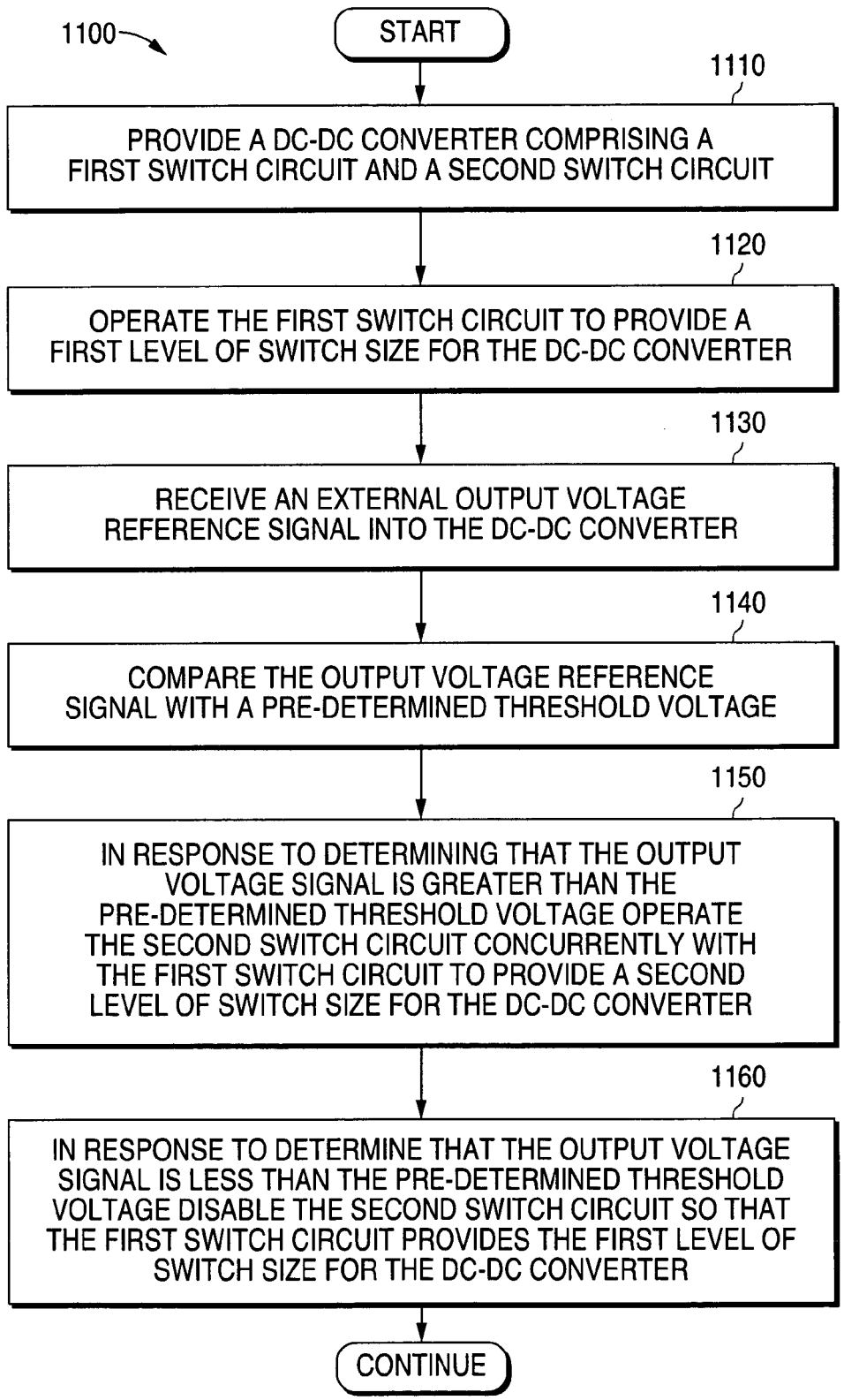
FIG. 11 illustrates a flow chart showing the steps of an advantageous embodiment of a method of operation of the present invention.

FIG. 11 illustrates a flow chart 1100 showing the steps of an advantageous embodiment of a method of operation of the present invention. Although the steps of the method are shown sequentially in FIG. 11, it is understood that the steps of the method are performed simultaneously in a DC-DC converter circuit. The steps are shown sequentially in FIG. 11 only for purposes of explanation. In the first step of the method, a DC-DC converter 600 is provided that comprises a first switch circuit 660 and a second switch circuit 670 (step 1110). The first switch circuit 660 is operated to provide a first level of switch size for the DC-DC converter 600 (step 1120).

An external output voltage reference signal is received into the DC-DC converter 600 (step 1130). A comparator circuit 640 compares the output voltage reference signal with a pre-determined threshold voltage 650 (step 1140). In response to determining that the output voltage reference signal is greater than the pre-determined threshold voltage 650, the second switch 670 is operated concurrently with the first switch 660 to provide a second level of switch size for the DC-DC converter 600 (step 1150).

In response to determining that the output voltage reference signal is less than the pre-determined threshold voltage 650, the second switch 670 is disabled so that the first switch 660 provides the first level of switch size for the DC-DC converter 600 (step 1160). In this manner the DC-DC converter 600 uses the output voltage reference signal to provide efficient switch size management.

The foregoing description has outlined in detail the features and technical advantages of the present invention so that persons who are skilled in the art may understand the advantages of the invention. Persons who are skilled in the art should appreciate that they may readily use the conception and the specific embodiment of the invention that is disclosed as a basis for modifying or designing other structures for carrying out the same purposes of the present invention. Persons who are skilled in the art should also realize that such equivalent constructions do not depart from the spirit and scope of the invention in its broadest form.

Although the present invention has been described with an exemplary embodiment, various changes and modifications may be suggested to one skilled in the art. It is intended that the present invention encompass such changes and modifications as fall within the scope of the appended claims.

What is claimed is:

1. A direct current to direct current (DC-DC) converter circuit having a direct current input, said converter circuit comprising:
   a first switch circuit;
   a second switch circuit connected in parallel with said first switch circuit;
   a third switch circuit;
   a fourth switch circuit; and
   control circuitry coupled to said switch circuits, said control circuitry configured to receive a direct current output voltage reference signal and utilize said direct current output voltage reference signal to select an operation of at least one of said switch circuits to generate a direct current output voltage signal of said DC-DC converter circuit, wherein said control circuitry comprises:
      a first output switch driver having a plurality of first control signal outputs configured to control said first switch circuit, a portion of said third switch circuit, and a portion of said fourth switch circuit; and
      a second output switch driver having a plurality of second control signal outputs configured to control said second switch circuit, another portion of said third switch circuit, and another portion of said fourth switch circuit.

2. The converter circuit as set forth in claim 1, wherein: said control circuitry is configured to operate said first switch circuit to provide the direct current output voltage signal that is based on the operation of said first switch circuit.

3. The converter circuit as set forth in claim 2, wherein: said control circuitry is configured to concurrently operate said second switch circuit with said first switch circuit to provide the direct current output voltage signal that is based on the operation of said second switch circuit and said first switch circuit.

4. The converter circuit as set forth in claim 3, wherein: said control circuitry is configured to compare said direct current output voltage reference signal with a direct current threshold voltage; and
   said control circuitry is configured to concurrently operate said second switch circuit with said first switch circuit only when said direct current output voltage reference signal is greater than said direct current threshold voltage.

5. The converter circuit as set forth in claim 1, wherein said converter circuit is reconfigurable to operate in one of: a buck mode and a boost mode.

6. The converter circuit as set forth in claim 1, wherein said control circuitry further comprises:
   a pulse width modulation controller having (i) an output coupled to an input of said first output switch driver and to a first input of said second output switch driver and (ii) an input configured to receive said direct current output voltage reference signal; and
   a comparator circuit having (i) a first input configured to receive said direct current output voltage reference signal, (ii) a second input coupled to a direct current threshold voltage source, and (iii) an output coupled to a second input of said second output switch driver.

7. The converter circuit as set forth in claim 1, wherein:
   said first switch circuit comprises a PMOS transistor and an NMOS transistor coupled in a switch configuration; and
   said second switch circuit comprises a PMOS transistor and an NMOS transistor coupled in a switch configuration.

8. The converter circuit as set forth in claim 7, wherein:
   the third switch circuit comprises two PMOS transistors coupled in a switch configuration;
   the fourth switch circuit comprises two NMOS transistors coupled in a switch configuration;
   the first output switch driver is configured to control the PMOS transistor and the NMOS transistor in the first switch circuit, one of the PMOS transistors in the third switch circuit, and one of the NMOS transistors in the fourth switch circuit; and
   the second output switch driver is configured to control the PMOS transistor and the NMOS transistor in the second switch circuit, another of the PMOS transistors in the third switch circuit, and another of the NMOS transistors in the fourth switch circuit.

9. The converter circuit as set forth in claim 1, wherein:
   the first and second switch circuits are coupled to a first end of an inductor; and
   the third switch circuit is coupled to a second end of the inductor and to a node that provides the direct current output voltage signal.

10. The converter circuit as set forth in claim 1, wherein:
    the first and second switch circuits have outputs coupled to a first end of an inductor, the first and second switch circuits also coupled to ground; and
    the fourth switch circuit is coupled to a second end of the inductor and to ground.

11. A direct current to direct current (DC-DC) converter circuit having a direct current input, said converter circuit comprising:
    first and second switch circuits connected in parallel; and
    control circuitry coupled to the switch circuits, said control circuitry configured to receive a direct current output voltage reference signal and utilize said direct current output voltage reference signal to selectively operate at least one of the switch circuits to generate a direct current output voltage signal of said DC-DC converter circuit;
    wherein the control circuitry is configured to operate only the first switch circuit to generate the direct current output voltage signal when the direct current output voltage reference signal is less than a direct current threshold voltage; and wherein the control circuitry is configured to operate both the first and second switch circuits to generate the direct current output voltage signal when the direct current output voltage reference signal is greater than the direct current threshold voltage.

12. The converter circuit as set forth in claim 11, wherein the converter circuit is reconfigurable to operate as one of: a buck converter circuit, a boost converter circuit, and buck-boost converter circuit.

13. The converter circuit as set forth in claim 11, wherein:
the first switch circuit comprises at least one first transistor in a switch configuration; and
the second switch circuit comprises at least one second transistor in a switch configuration.

14. The converter circuit as set forth in claim 11, wherein:
said converter circuit further comprises a third switch circuit; and
said control circuitry is configured to concurrently operate said third switch circuit with said first and second switch circuits to provide said direct current output voltage signal when the direct current output voltage reference signal is greater than the direct current threshold voltage and greater than a second direct current threshold voltage.

15. The converter circuit as set forth in claim 11, wherein said control circuitry comprises:
a plurality of output switch drivers, wherein each output switch driver has an output coupled to at least one of the switch circuits;
a pulse width modulation controller having (i) an output coupled to an input of each of said output switch drivers and (ii) an input configured to receive said direct current output voltage reference signal; and
a plurality of comparator circuits, wherein each comparator circuit has (i) a first input configured to receive said direct current output voltage reference signal, (ii) a second input coupled to one of a plurality of direct current threshold voltage sources, and (iii) an output coupled to another input of one of the output switch drivers.

16. A method for providing switch size management comprising the steps of:
providing a direct current to direct current (DC-DC) converter having a direct current input, the converter comprising first, second, and third switch circuits connected in parallel and control circuitry for controlling said switch circuits;
providing a direct current output voltage reference signal to said control circuitry; and
utilizing said direct current output voltage reference signal to select an operation of at least one of the switch circuits to generate a direct current output voltage signal of said DC-DC converter;

wherein utilizing the direct current output voltage reference signal comprises:
operating only the first switch circuit to generate the direct current output voltage signal when the direct current output voltage reference signal is less than a first direct current threshold voltage;
operating both the first and second switch circuits to generate the direct current output voltage signal when the direct current output voltage reference signal is greater than the first direct current threshold voltage and less than a second direct current threshold voltage; and
operating the first, second, and third switch circuits to generate the direct current output voltage signal when the direct current output voltage reference signal is greater than the first direct current threshold voltage and greater than the second direct current threshold voltage.

17. The method as set forth in claim 16, wherein each of the switch circuits comprises a PMOS transistor and an NMOS transistor coupled in a switch configuration.

18. The method as set forth in claim 17, wherein utilizing the direct current output voltage reference signal comprises:
comparing said direct current output voltage reference signal with said first direct current threshold voltage; and
operating said second switch circuit concurrently with said first switch circuit to provide said direct current output voltage signal only when said direct current output voltage reference signal is greater than said first direct current threshold voltage.

19. The method as set forth in claim 18, wherein utilizing the direct current output voltage reference signal comprises:
comparing said direct current output voltage reference signal with said second direct current threshold voltage; and
operating said third switch circuit concurrently with said first switch circuit and said second switch circuit to provide said direct current output voltage signal only when said direct current output voltage reference signal is greater than said second direct current threshold voltage.

20. The method as set forth in claim 19, further comprising the steps of:
disabling said third switch circuit when said direct current output voltage reference signal is less than said second direct current threshold voltage; and
disabling said second switch circuit when said direct current output voltage reference signal is less than said first direct current threshold voltage.

* * * * *

UNITED STATES PATENT AND TRADEMARK OFFICE
CERTIFICATE OF CORRECTION

| | | |
|---|---|---|
| PATENT NO. | : 7,638,991 B1 | Page 1 of 1 |
| APPLICATION NO. | : 11/260128 | |
| DATED | : December 29, 2009 | |
| INVENTOR(S) | : Hidenori Kobayashi | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 320 days.

Signed and Sealed this

Twenty-first Day of December, 2010

David J. Kappos
*Director of the United States Patent and Trademark Office*